United States Patent [19]

Treiber et al.

[11] 4,096,968

[45] Jun. 27, 1978

[54] DOOR MOUNTING AND ACTUATOR FOR A PRESSURE VESSEL

[75] Inventors: Fritz F. Treiber, Centerville; Francis E. Graham, Kettering, both of Ohio

[73] Assignee: Hobart Corporation, Troy, Ohio

[21] Appl. No.: 833,720

[22] Filed: Sep. 16, 1977

[51] Int. Cl.² ............................................ B65D 45/28
[52] U.S. Cl. .................................... 220/314; 220/244
[58] Field of Search ............... 220/243, 244, 246, 247, 220/251, 213, 314

[56] References Cited

U.S. PATENT DOCUMENTS

| | | | |
|---|---|---|---|
| 2,904,212 | 9/1959 | Vischer, Jr. ........................... | 220/244 |
| 3,045,861 | 7/1962 | Dieter et al. .......................... | 220/314 |

Primary Examiner—George T. Hall
Attorney, Agent, or Firm—Biebel, French & Nauman

[57] ABSTRACT

A pressure vessel such as a steam cooker is provided with a door closure comprising a horizontally disposed door mounting and actuating member pivotally mounted for swinging movement across an access opening of the vessel and supporting a warped door for movement into and out of the opening; a rotationally and axially movable shaft carried in the door mounting member has a cam and follower associated therewith for moving the shaft axially in response to rotation thereof; and mechanism coupling the door and the shaft for shifting the door laterally with respect to the door mounting member also causes translational movement of the door toward and away from the door mounting member in response to rotation of the shaft so that the door can be inserted through the opening in a warped condition and then unwarped so that the outer peripheral edge sealingly engages the inside of the opening. The operating handle for the actuating mechanism is located to one side of the access opening when the door is closed.

12 Claims, 11 Drawing Figures

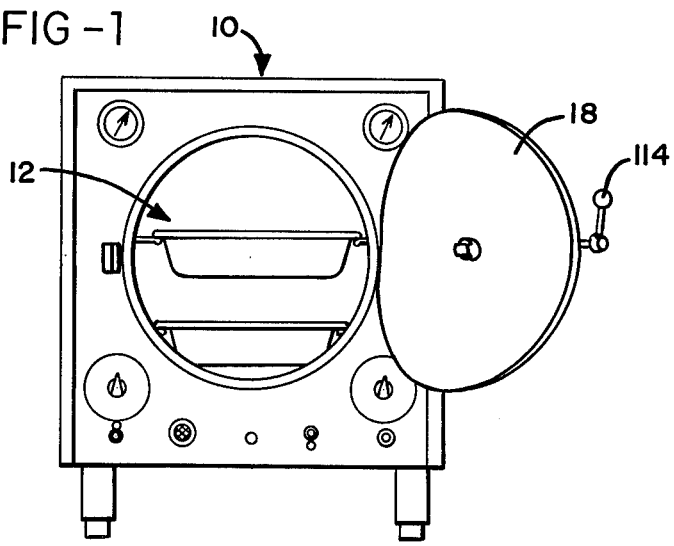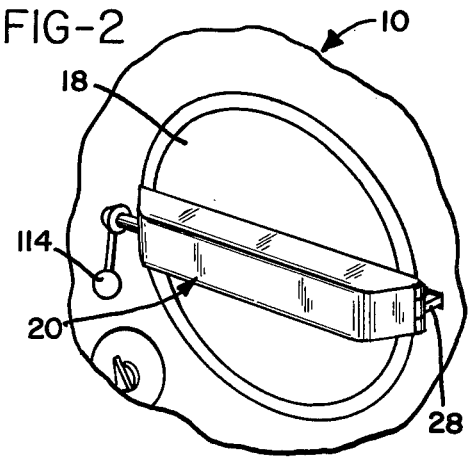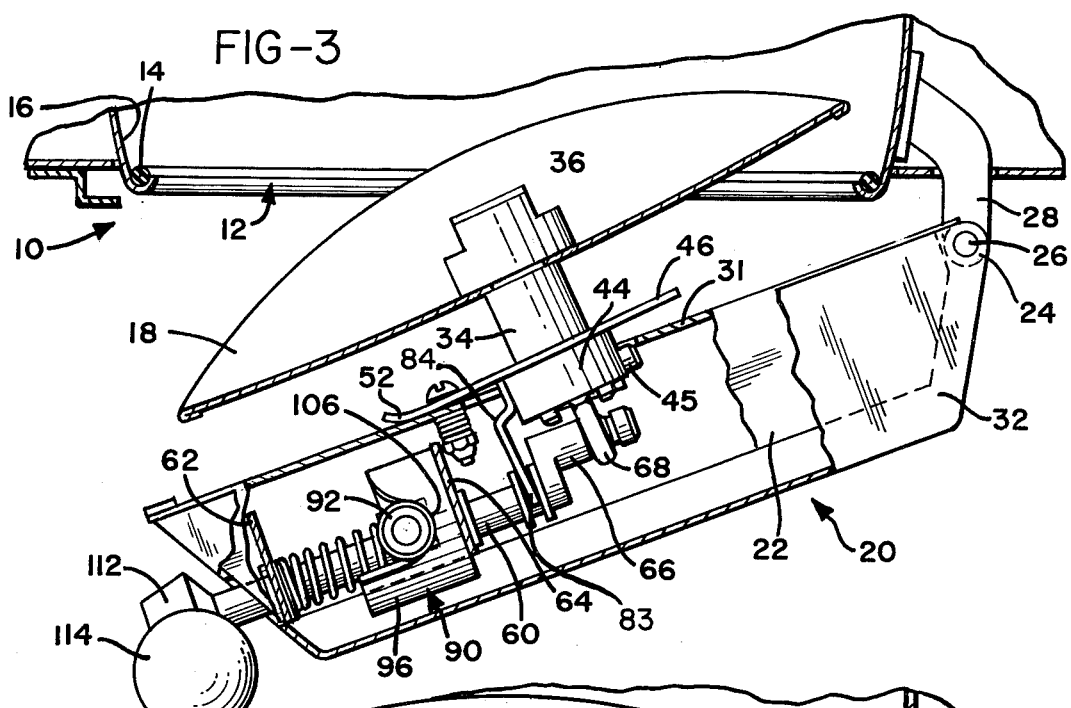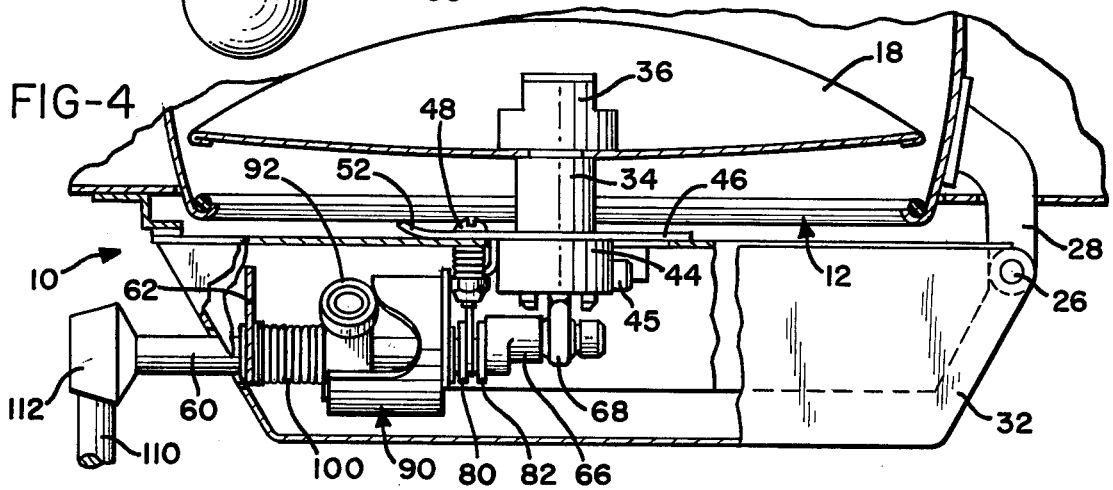

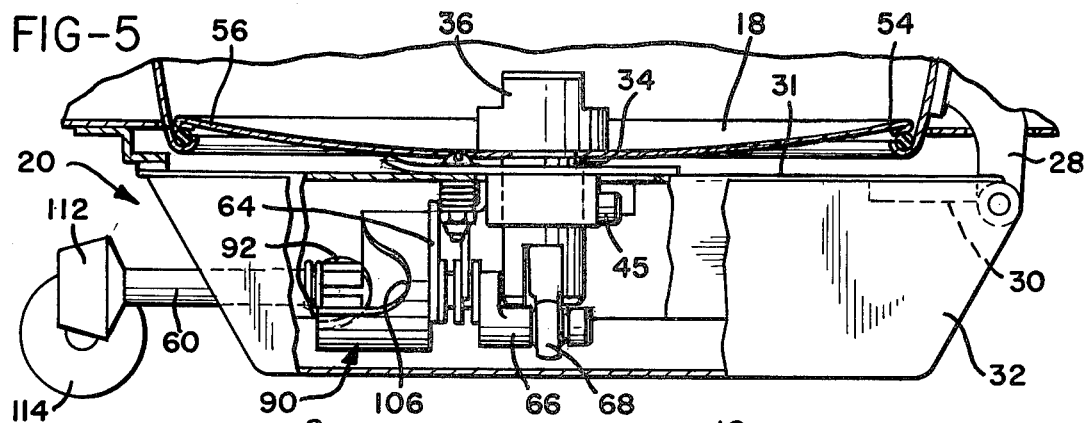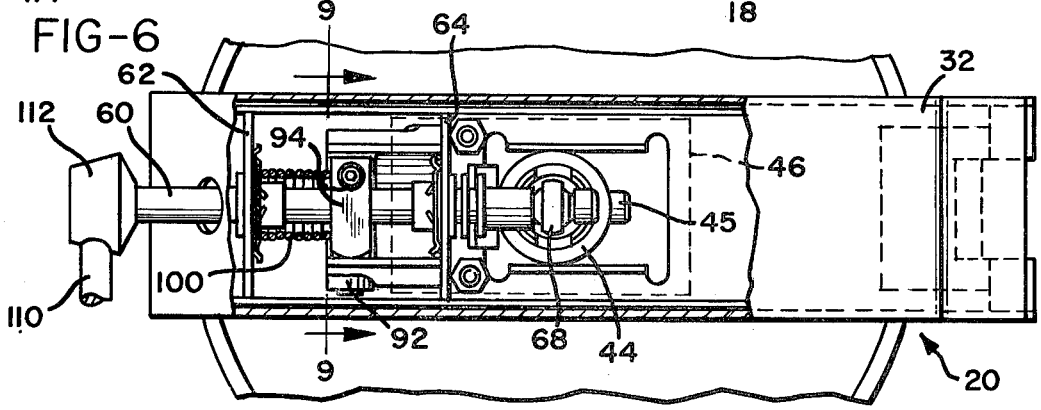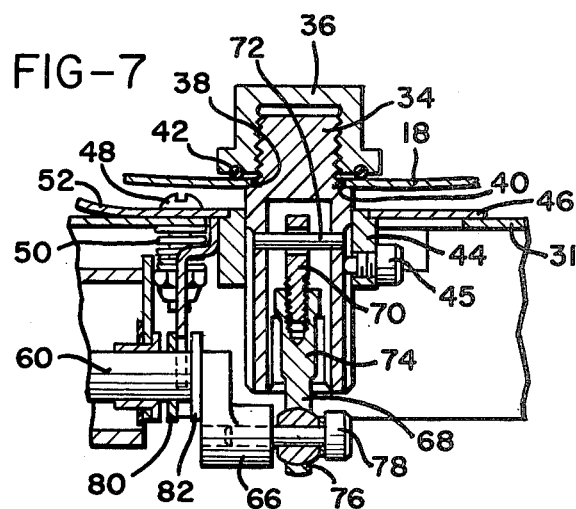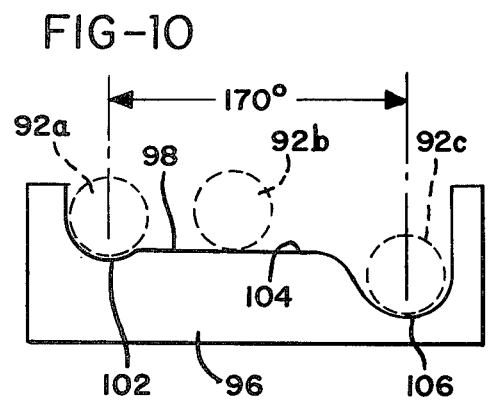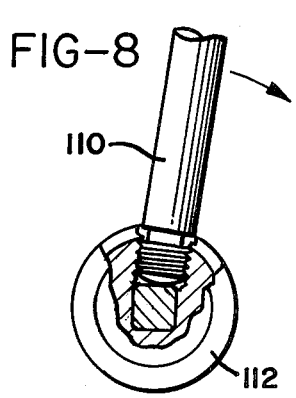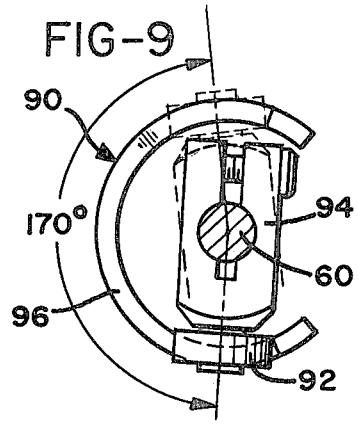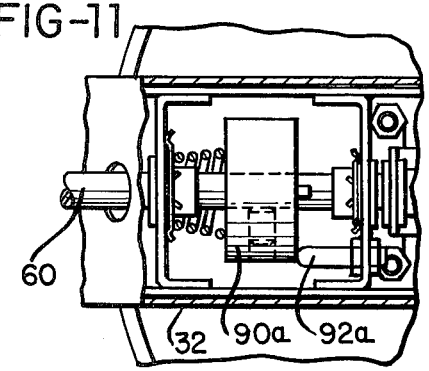

DOOR MOUNTING AND ACTUATOR FOR A PRESSURE VESSEL

BACKGROUND OF THE INVENTION

1. Field of the Invention

The present invention relates to means for sealing pressure vessels, and more particularly, to a door mounting and actuating mechanism for a door of the warped expandable type.

2. Prior Art

Although the door mounting and actuating mechanism of the present invention can be utilized on different types of pressure vessels and different types of doors used to close access openings in those pressure vessels, in its preferred form it is directed to utilization with pressure vessels of the type disclosed in U.S. Pat. Nos. 2,904,212 and 3,961,817, and 3,409,164, all assigned to the assignee of this application. These pressure vessels are used for food preparation in restaurants and institutional kitchens and employ a generally disc-shaped access door which is stressed initially so as to be warped on a diameter.

During use, the door is positioned inside the pressure vessel which has a circular access opening slightly smaller in diameter than the non-warped diameter of the door. Door warp facilitates insertion of the door through the access opening, and after insertion through the access opening the door is stressed against an interior rim of the access opening to expand the door and achieve an air tight seal. As the stressing takes place the door is flexed to remove the warp and assume the configuration of a spherical section of circular outline. Thus, in effect, the door is moved from a contracted position in which it can be passed through the opening into an expanded position where it seals against the inner walls of the pressure vessel.

Since doors of the type disclosed in the aforementioned patents are warped in such a manner that their vertical dimension contracts while the horizontal dimension expands, or vice versa, the means for mounting the door at the exterior of the pressure vessel must provide for shifting the door back and forth laterally in order for it to pass through the opening and then be centered within the access opening, so that it can be brought against the internal surfaces of the pressure vessel to expand into sealing engagement with the walls of the pressure vessel.

Several means for accomplishing the necessary compound movements of the door have already been devised. For example, the movement may be provided by a cam device as shown in Vischer U.S. Pat. No. 2,904,212, a worm and crank arrangement as shown in Vischer U.S. Pat. No. 3,409,164, or a camming assembly of the type shown in Shrimsher U.S. Pat. No. 3,961,817.

It is to be noted that in all of these prior art mechanisms for closing such doors, such component of horizontal force must be applied by the operator, in both opening and closing procedures. It has been discovered that application of this horizontal force component, especially when the operator is in a hurry and may not exercise proper care, causes table top cookers to be moved sideways over the greasy surface of a table on which they are resting. This movement, especially if caused repeatedly, can result in damage to the cooker or other equipment or structures which are disposed adjacent the cookers.

It is therefore an object of the present invention to provide a door closure mechanism which eliminates the need for application of a horizontal force component by an operator to the mechanism for opening or closing the door of a pressure vessel.

SUMMARY OF THE INVENTION

The present invention provides an improvement over the above referred to door closure mechanisms for pressure vessels by providing a mechanism whereby the necessary compound movements of the door can be achieved with only vertical force being applied to the lever utilized to manually activate the closing mechanism.

This is achieved through the use of a door closing mechanism basically comprising a door support member positionable across the vessel opening and pivotally supported adjacent the opening, a rotationally and axially movable shaft member attached to the door support member for movement therewith, cam and follower means operably associated with the shaft and door support member for moving the shaft axially in response to rotation thereof, and means coupling the door and shaft and responsive to axial movement of the shaft for shifting the door laterally with respect to the door support member and also for causing translational movement of the door toward and away from the door support member in response to shaft rotation so that the door will sealingly engage and disengage the pressure vessel.

Since the door is warped so that it will contract usually in a vertical direction, it is desirable to provide in the actuating mechanism a means for canting the door relative to its support member when the door is open to allow easy entry of the door through the opening, and for aligning the door with the opening when the door is in position to be expanded into sealing engagement with the inside walls, e.g., the rim of the pressure vessel around the opening.

The cam of this mechanism is preferably secured to the support member and the follower is attached to a rotating shaft member and urged against the cam so that the shaft will execute the desired axial movement at a predetermined degree of rotation of the shaft member. The handle for rotating the shaft is secured to the shaft end farthest from the pivotal support for the mounting and actuating mechanism, and thus located beyond the side of the opening.

The opening end of this shaft is provided with a crank member which in turn is connected to a piston to which the center of the door is secured, and the piston is held in a cylindrical guide on the support member. Thus, rotation of the shaft by the handle causes the piston to move toward or away from the door support member so that the door will engage or disengage the interior seal of the pressure vessel. The cylindrical guide is carried by the door support member in such a manner that the guide, piston and door can move axially of the shaft, from a position where the door is centered in the access opening to a position where it is offset from the center of the access opening and can be canted for removal through the opening upon pivoting of the support member.

In order to cant the door slightly to permit it to pass easily through the opening, a spring plate is secured between the support member and the cylindrical guide and biases the piston and guide so as to cant the door while it is in the contracted position where it will pass through the opening. Upon axial movement of the shaft the plate will yield to align the door properly with the access opening.

The handle used to rotate the shaft easily located to one side of the opening, and is preferably rotatable through approximately 170° from a "door open" position disposed substantially vertically upward to a downwardly extending position, preferably slightly outward from a vertical plane through the axis of the shaft, when the door is closed and sealed. This positioning of the handle produces a tendency for the operator to exert substantially downward (as distinguished from sideward or rearward) force when the major effort is needed to close the door.

The cam surface is preferably designed with a slight indentation or detent in the fully closed position which tends to maintain the door closed. The portion of the cam surface following the detent is substantially flat since rotation of the handle during this part of cam/follower engagement causes the piston and door to move inwardly of the pressure vessel away from the support member. As the follower transverses the flat portion of the cam surface, the plate causes the door to cant slightly, such that the edge of the door closest to the pivot point moves away from the door support member. The last portion of the cam surface is shaped so that the shaft will be shifted axially to move the access door laterally off the center of the opening when the handle is rotated to the open position.

Thus, the cam/follower mechanism is used for door shifting and locating, and the crank/piston mechanism produces the closing and sealing force. The crank is adjustable to accommodate tolerance in the door construction and movement between warped and unwarped positions.

BRIEF DESCRIPTION OF THE DRAWINGS

FIG. 1 is a front elevational view of a steam cooker with the latching mechanism of the present invention supporting the door in the open position;

FIG. 2 is a pictorial view of a portion of the steam cooker of FIG. 1 showing the door and the latching mechanism in the closed position;

FIG. 3 is a top plan view in partial cross section and partially cut away, of the access opening of the steam cooker of FIG. 1 and the door and latching mechanism of the preferred embodiment with the door in an open position partially inserted in the access opening;

FIG. 4 is a view as in FIG. 3 with the door completely inserted in the access opening, but not yet in sealing engagement with the inside walls of the steam cooker;

FIG. 5 is a view as in FIGS. 3 and 4 with the door in the closed position in sealing engagement with the inside of the rim around the opening of the steam cooker;

FIG. 6 is a front elevational view in partial cross section of the door and latching mechanism of the preferred embodiment in the door closed position;

FIG. 7 is an enlarged top view in cross section of a portion of the door and latching mechanism of the preferred embodiment with the door closed;

FIG. 8 is a partial cross sectional view of the operating handle and end of the rotating shaft of the preferred embodiment;

FIG. 9 is a view of the cam and follower of the preferred embodiment looking in the direction of line 9—9 of FIG. 6;

FIG. 10 is a view of the cam unwrapped and lying in a flat plane and showing various positions of the cam follower; and FIG. 11 shows an alternate embodiment of cam and follower.

DETAILED DESCRIPTION OF THE PREFERRED EMBODIMENT

Although the door latching mechanism of the present invention can be utilized on many types of pressure vessels to seal access openings therein, in its preferred form it is constructed to close the access opening on a steam cooker having a housing shown generally as 10 in FIG. 1. Such cookers are commonly utilized in the restaurant and commercial cooking establishments for rapidly cooking or heating food. The access opening 12 of the pressure vessel is supported in the front surface panel of the housing, and is generally circular, provided with a rim 13 and an internal seal member 14 in the form of an O-ring. Seal member 14 is mounted around the entire periphery of the access opening on the inside wall 16 to seal the door during cooking.

The door 18 is generally disc-shaped, warped during fabrication so as to contract in the vertical dimension unless the door is pressed against the seal ring 14 on the inside of the steam cooker. Construction of the door is well known and is referred to in the above referenced U.S. patents and forms no part of the present invention.

When the door is pressed against the seal member 14, it is stressed to an unwarped position wherein its peripheral edge is circular and the door forms a spherical segment. The door is pressed against the seal member 14 by pulling outwardly on the central region thereof so that the warp is removed from the door so long as it is held against the seal member.

It can be seen that this particular construction provides a contractible door which allows insertion of the door through the access opening. The door must be able to contract along a diameter sufficiently to pass through the access opening and subsequently to expand inside the access opening. In addition, since the door is supported from a hinged position adjacent the access opening it is helpful to cant the door slightly so that its larger dimension (when warped) can pass freely through the access opening.

The door is pivotally supported on the front of the housing 10 by the mounting and actuating mechanism shown generally as 20. This mechanism has a main door support member 22 in the form of a channel, generally U-shaped in vertical cross section, opening outward away from the door. The end portion 24 of this channel is pivotally secured by pin 26 to a hinge bracket 28 mounted to the side of the pressure vessel and extending through the front surface of the housing 10. Preferably the end portion 24 is provided with a hinge plate 30 which engages the hinge bracket 28 so as to pivot horizontally about the vertical pin 26. Hinge plate 30 is secured to the back portion 31 of the channel-shaped main support member 22 by welding or the like.

A decorative cover 32, also generaly channel-shaped in cross section, but slightly larger than main support member 22, is provided to enclose the door latch mechanism. Cover 32 is placed over support member 22 with the opening disposed inwardly towards the door and is secured to the main support member 32 with a plurality of screws (not shown) in order to permit the cover to be removed for servicing of the door mechanism.

The door 18 is secured to the door actuating mechanism 20 by a cylindrical piston member 34 as best seen in FIG. 7. A closed nut or end cap 36 is threaded onto the end portion of piston member 34 and holds the door 18 against an annular shelf or seat 40 on the piston member. An O-ring seal 42 is provided between door 18 and nut 36 to prevent loss of pressure through the opening 38 in the door.

Piston 34 is supported in a cylindrical guide member 44 for inward and outward movement relative to the access opening of the steam cooker. A ball detent member 45 is threaded into the side of guide member 44 and a mating indentation in the side of piston member 34 is provided to prevent rotation of the piston and the door.

The guide member 44 is secured (as by welding) to a plate 46, which in turn is yieldingly supported on the back surface 31 of main support member 22 by bolts 48 which are provided with compression springs 50. Plate 46 is a rectangular flat plate which is bent slightly at its end portion 52, where it is mounted by bolts 48 to the back of support member 22. The bent portion 52 provides a fulcrum point such that when the piston member and the door 18 move away from the back of support member 22, plate 46 will cant slightly, thus causing the piston member 34 and door 18 to also be canted slightly so that the edge portion 54 of the door closest to the pivotal end portion 24 of the latch mechanism 20 will be farther away from the base member 22 than the opposite edge portion 56.

The degree of cant necessary in order to permit the door to be inserted through the access opening in the steam cooker will depend upon several factors such as the diameter of the door, diameter of the access opening, swinging radius from the pivot point of the door latch mechanism, and the contracted vertical dimension of the door. For example, using an eight inch diameter door a cant of approximately 4.5 degrees has proved satisfactory when the pivot point is approximately five inches from the center of the door.

Plate 46 must also be movable laterally of the main support member 22 to accommodate displacement of the piston member and door to and from a position horizontally offset in the direction of the pivot or hinge from the center line of the access opening, to allow the door to move freely through the steam cooker when the mechanism 20 is pivoted about pin 26. Thus, the openings in the plate 46, through which bolts 48 extend, are in the form of elongated slots which permit the plate, piston and door to be shifted laterally by a further portion of the mechanism 20, described below.

In order to effect the above referred to movements, shifting the door laterally and moving it inwardly and outwardly relative to the access opening, a main drive shaft 60 is provided. Shaft 60 is supported on main support member 22 by a pair of horizontally spaced brackets 62 and 64 so that the drive shaft is disposed with its longitudinal axis extending horizontally and parallel to the back 31 of main support member 22. Shaft 60 is so supported by brackets 62 and 64 that it can be both rotated and moved translationally along its axis.

A crank member 66 is secured to one end of shaft 60, and piston member 34 is connected to the crank member 66 through an adjustable connecting rod 68. Connecting rod 68 is composed of several parts. One part 70 is pivotally secured to a pin 72 mounted in piston member 34, so that part 70 will pivot in a vertical plane upon rotation of crank member 66. Another part 74 is threaded at one end onto part 70, to provide a means for adjusting the length of the connecting rod member 68, and has its opposite end mounted on a spherical bearing member 76 which permits angular movement of part 74 relative to the crank member 66.

The spherical bearing member 76 is mounted to the outer end of crank 66 by bolt 78. Rotation of crank member 66 by shaft 60 will thus cause longitudinal movement of piston 34, to carry door 18 toward and away from the support member 22. The spherical bearing member 76, and the loose connection between pin 72 and part 70 permit the piston and the door to be canted by plate 46.

Near the end portion of shaft 60, adjacent the crank member 66, there is a pair of washers 80 and 82 (FIG. 7) which are secured in axially spaced relation on shaft 60. Extending between these washers is the forked end 83 of a bracket 84. The opposite end 86 of bracket 84 is secured to plate 46, between bolts 48. This arrangement causes lateral shifting of the plate 46 and therefore shifting and canting of the piston and door, upon axial movement of shaft 60.

In order to effect movement of the door in an appropriately timed sequence relative to rotation of shaft 60, a cam and follower mechanism, shown generally as 90, is utilized. In the preferred embodiment the cam follower 92 is a ball bearing roller mounted for rotation on an arm 94 extending perpendicular to the drive shaft 60 and clamped thereto. Thus, the follower 92 moves in a circular path in a plane perpendicular to the axis of drive shaft 60. The cam member 96 is cylindrical in form and secured to main support member 22, such as by welding it to bracket 64.

The cam member 96 includes a cam surface 98 in line with the follower 92, which is urged into contact with the cam surface 98 by a compression spring 100 diposed concentrically around the shaft 60 and maintained in a compressed state by engagement at one end with bracket 62, and at the other end with arm 94.

The development of cam surface 98 is shown in FIG. 10. When the door is in the closed position as illustrated in FIG. 5, follower 92 is in position 92a in FIG. 10. A slight indentation or detent 102 in the cam surface 98 is provided in this position so that an initial force must be applied to shaft 60 to move the follower 92 up out of the indentation 102. This indentation 102 prevents the door from opening due to a decrease in pressure or a negative pressure within the steam cooker 10 as often occurs at the end of a cooking cycle.

As the shaft 60 is rotated from the door closed position, follower 92 moves along the flat central portion 104 of camming surface 98, while piston member 34 is moved inwardly relative to the steam cooker 10 by crank 66, thus releasing the edges of the door from their sealing engagement around the access opening. After the door has been moved sufficiently inwardly away from the access opening, roller member 92 moves to position 92c in FIG. 10.

In this position the door is shifted laterally with respect to the main support member 22 towards the pivot pin 26. This amount of shifting is so designed that the warped door will be aligned for movement through the central region of the access opening of maximum vertical dimensions. As the door is moved outwardly (the follower travelling through the region 104 of the cam) it will also be canted due to the position of plate 46, and will be held in the canted position when follower 92 is in position 92c, i.e., in the door fully opened condition.

In order to rotate shaft 60 to cause the above described movements of the door, a handle 110 is secured to the outer end of shaft 60 by means of a coupling member 112, as best seen in FIG. 8. The outer end of shaft 60 has a rectangular cross section on which is fitted a coupling member 112 with corresponding mating opening. The member 112 has a threaded transverse hole in which handle 110 is threaded to engage the end portion of shaft 60, holding the coupling member 112 and the handle 110 in place. The handle 110 is so disposed that when the door is in the closed position handle 110 will extend vertically downward.

As previously mentioned, the cam surface 98 is so designed that shaft 60 is permitted to rotate through substantially 170°. This results in handle 110 being disposed 10° off of vertical when the door is in the fully open position. Thus, when the operator pushes downward on the ball member 114 a horizontal component of the downward force will cause the handle to rotate in a vertical plane so as to open the door, once the detent action of cam section 102 is overcome. Also, the angular relation of follower 92 and crank 66, with respect to the longitudinal axis of shaft 60, is such that crank 66 is somewhat over-center when the door is fully closed. This precludes movement of the door in response to negative pressures in the vessel as may occur at the end of an operating cycle.

In operation, considering the door to be in a closed position as illustrated in FIG. 5, handle 110 is rotated upward, outwardly away from the front face of the housing 10. This movement causes follower 92 to be rotated out of the cam indentation 102 onto cam surface 104 while crank 66 moves piston member 34, and thus door 18, towards the interior of the vessel. As rotation of handle 110 is continued and follower 92 proceeds along the flat cam surface 104, piston member 34 continues to move towards the interior of the vessel allowing door 18 to again warp to its contracted position. Also, as the door proceeds to move inwardly away from the access opening due to movement of roller member 92 along camming surface 104, spring plate 46 begins to cant the piston member 34, and thus door 18, so that the end portion 54 of the door adjacent the pivotal position of the door latching mechanism 20 is farthest away from the door support member 22.

As rotation of handle 110 is continued to its uppermost position, follower 92 proceeds along the cam surface into indentation 106, which causes shaft 60 to be moved axially thus moving piston 34, door 18, and plate 46 laterally towards the pivotal pin 26. With the door in this position it can be pivoted outwardly passing through the access opening. In order to close the door the reverse procedure is utilized.

FIG. 11 shows an alternate embodiment of the invention wherein the mounting of the cam follower and the cam of the preferred embodiment are reversed. Cam 90a is mounted to the shaft 60 is rotated by movement of the handle 110, while the cam follower 92a is mounted stationary on the main support member 32. The cam follower 92a is a sliding follower instead of the roller shown in FIGS. 3-10, and may be built of suitable low friction materials. In a small steam cooker, wherein the door may be of about six inches diameter, and the forces needed to move the door are therefore smaller, this modification may be desirable for lower manufacturing cost.

While the form of apparatus herein described constitutes a preferred embodiment of this invention, it is to be understood that the invention is not limited to this precise form of apparatus, and that changes may be made therein without departing from the scope of the invention.

What is claimed is:

1. Apparatus for mounting and actuating a closure door of a pressure vessel, comprising:
    an elongated door support member positionable across the vessel opening and pivotally supported adjacent said opening to swing toward and away from said opening;
    a rotationally and axially movable shaft mounted lengthwise on said door support member;
    cam and follower means operably associated with said shaft and said door support member for moving said shaft axially in response to rotation thereof; and
    coupling means connecting said shaft to the door and responsive to axial movement of said shaft for shifting the door laterally with respect to said door support member and for causing translational movement of the door toward and away from said door support member in response to shaft rotation.

2. Apparatus as defined in claim 1 wherein said coupling means includes:
    a crank member secured to said shaft for axial and rotational movement therewith; and
    piston means supporting the door and mounted transversely of said shaft, said piston means being connected to said crank member.

3. Apparatus as defined in claim 2 including a connecting rod connecting said piston means to said crank member and being adjustable in length for varying the position of said door relative to said shaft.

4. Apparatus as defined in claim 2, wherein said crank member is constructed and arranged to be overcenter with the door in closed and sealed position.

5. Apparatus as defined in claim 1 including a handle for rotating said shaft secured thereto for rotation in a direction toward and away from the vessel to turn said shaft sufficiently to cause full opening and closing movement of the door with handle movement of no more than 180°.

6. Apparatus as defined in claim 5, wherein said handle is located at one end of said support member, spaced to one side of the opening with the door closed.

7. Apparatus as defined in claim 1 wherein said cam and follower means further includes:
    a cylindrical cam concentric with said shaft and having a cam surface defined in the cylindrical wall thereof;
    a follower engaging said cam surface;
    one of said cam and follower being secured to said shaft and the other secured to said support member; and
    means maintaining said follower in engagement with said cam surface during rotation of said shaft to cause simultaneous axial shaft motion.

8. Apparatus as defined in claim 7 wherein said cam surface is generated such that initial rotation of said shaft from a door open position will cause said shaft to move axially and thus cause the door to move laterally to a position ready for sealing engagement, and further rotation of said shaft will cause said door to move into sealing engagement with the rim of the opening in the vessel.

9. Apparatus as defined in claim 8 wherein said cam surface includes a detent portion holding the door in its sealed position.

10. A device for sealing an opening in a pressure vessel, comprising:
- a door movable into the pressure vessel through the opening and expandable from a warped position wherein it will fit through the opening and an expanded position wherein it will seal against the inside of the rim of the opening;
- a door support hinged to the pressure vessel and supporting the door for swinging movement through the opening; and
- actuating means on said door support and securing said door to said door support, said actuating means including:
  - a shaft extending substantially transversely of said door support and mounted for both axial rotation and longitudinal movement;
  - a cylinder on said door support extending substantially perpendicular to said shaft toward the opening;
  - a piston in said cylinder secured to and carrying the door so that said movement of said piston causes translational displacement of said door in the direction of movement of said piston means,
  - a crank connecting said piston to said shaft,
  - cam and follower means operably associated with said shaft for causing axial movement of said shaft resulting in substantially lateral movement of the door and said piston relative to said door support upon rotation of said shaft.

11. A device as defined in claim 10 and further including means for canting the door relative to said door support when the door is in its warped position so as to position the door for movement through the opening.

12. A device as defined in claim 11 wherein said canting means includes a plate member mounted for rocking motion on said support and fixed to said cylinder,
- spring means urging said plate member and cylinder away from perpendicular alignment with said door support to cant the door when in its contracted position, and a connection between said cylinder and said shaft to rock said plate upon lateral movement of said shaft until the door is disposed in alignment with the opening.

* * * * *

UNITED STATES PATENT AND TRADEMARK OFFICE
CERTIFICATE OF CORRECTION

PATENT NO. : 4,096,968
DATED : June 27, 1978
INVENTOR(S) : Fritz F. Treiber and Francis E. Graham It is certified that error appears in the above—identified patent and that said Letters Patent are hereby corrected as shown below:

Column 2, line 48, "opening" should be --opposite--.

Column 3, line 21, "transverses" should be --traverses--.

Signed and Sealed this

Fifth Day of December 1978

[SEAL]

Attest:

RUTH C. MASON
Attesting Officer

DONALD W. BANNER
Commissioner of Patents and Trademarks